(12) United States Patent
Zhang et al.

(10) Patent No.: US 9,031,597 B2
(45) Date of Patent: May 12, 2015

(54) DIFFERENTIAL CQI ENCODING FOR COOPERATIVE MULTIPOINT FEEDBACK

(71) Applicant: Marvell World Trade Ltd., St. Michael (BB)

(72) Inventors: Yan Zhang, Palo Alto, CA (US); Krishna Srikanth Gomadam, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 233 days.

(21) Appl. No.: 13/672,727

(22) Filed: Nov. 9, 2012

(65) Prior Publication Data

US 2013/0122953 A1   May 16, 2013

Related U.S. Application Data

(60) Provisional application No. 61/558,405, filed on Nov. 10, 2011.

(51) Int. Cl.
| | |
|---|---|
| *H04B 7/00* | (2006.01) |
| *H04W 72/00* | (2009.01) |
| *H04B 17/00* | (2006.01) |
| *H04W 24/02* | (2009.01) |
| *H04L 1/00* | (2006.01) |
| *H04L 5/00* | (2006.01) |
| *H04W 28/06* | (2009.01) |

(52) U.S. Cl.
CPC ............. *H04W 24/02* (2013.01); *H04W 28/06* (2013.01); *H04L 1/0029* (2013.01); *H04L 5/0035* (2013.01); *H04L 5/0057* (2013.01)

(58) Field of Classification Search
CPC .......................... H04W 24/02; H04W 72/0476
USPC .................................. 455/67.13, 63.1, 226.1
See application file for complete search history.

(56) References Cited

U.S. PATENT DOCUMENTS

| | | | |
|---|---|---|---|
| 5,231,629 A | 7/1993 | Kotzin et al. | |
| 5,263,160 A | 11/1993 | Porter, Jr. et al. | |
| 5,349,567 A | 9/1994 | Reed | |
| 5,940,439 A | 8/1999 | Kleider et al. | |
| 6,466,904 B1 | 10/2002 | Gao et al. | |

(Continued)

FOREIGN PATENT DOCUMENTS

| | | |
|---|---|---|
| EP | 2182754 A1 | 5/2010 |
| JP | 2008236222 A | 2/2008 |

(Continued)

OTHER PUBLICATIONS

U.S. Appl. No. 12/477,152 Official Action dated Jun. 26, 2012.

(Continued)

*Primary Examiner* — Tilahun B Gesesse

(57) ABSTRACT

A method includes receiving in a mobile communication terminal signals from multiple cells that coordinate transmission of the signals with one another in a Cooperative Multipoint (CoMP) scheme. At least first and second Channel Quality Indicators (CQIs), for respective communication channels over which the signals are received, are calculated in the terminal based on the received signals. The second CQI is differentially encoded relative to the first CQI. Feedback information, including the first CQI and the differentially-encoded second CQI, is transmitted from the terminal.

16 Claims, 2 Drawing Sheets

(56) References Cited

U.S. PATENT DOCUMENTS

| | | |
|---|---|---|
| 6,512,750 B1 | 1/2003 | Palenius |
| 6,757,319 B1 | 6/2004 | Parsa et al. |
| 6,865,237 B1 | 3/2005 | Boariu et al. |
| 7,839,944 B2 | 11/2010 | Lee et al. |
| 7,941,186 B2 | 5/2011 | Cho et al. |
| 8,036,286 B2 | 10/2011 | Lee et al. |
| 8,068,555 B2 | 11/2011 | Jongren et al. |
| 8,098,750 B2 | 1/2012 | Mueck et al. |
| 8,179,775 B2 | 5/2012 | Chen et al. |
| 8,325,844 B2 | 12/2012 | Walton et al. |
| 8,515,435 B2 | 8/2013 | Krasny et al. |
| 8,559,879 B2 | 10/2013 | Bhushan et al. |
| 8,565,808 B2 | 10/2013 | Hosono et al. |
| 8,694,017 B2 | 4/2014 | Bhushan |
| 2002/0001333 A1 | 1/2002 | Glasheen et al. |
| 2003/0035491 A1 | 2/2003 | Walton et al. |
| 2005/0108281 A1 | 5/2005 | Kim et al. |
| 2005/0141630 A1 | 6/2005 | Catreux et al. |
| 2005/0157810 A1 | 7/2005 | Raleigh et al. |
| 2005/0237920 A1 | 10/2005 | Howard et al. |
| 2005/0250544 A1 | 11/2005 | Grant et al. |
| 2005/0276317 A1 | 12/2005 | Jeong et al. |
| 2006/0014554 A1 | 1/2006 | Gerlach |
| 2006/0056538 A1 | 3/2006 | Nam et al. |
| 2006/0093060 A1 | 5/2006 | Jung et al. |
| 2006/0114858 A1 | 6/2006 | Walton et al. |
| 2006/0153112 A1 | 7/2006 | Lim et al. |
| 2006/0203777 A1 | 9/2006 | Kim et al. |
| 2006/0233131 A1 | 10/2006 | Gore et al. |
| 2006/0276212 A1 | 12/2006 | Sampath et al. |
| 2007/0058746 A1 | 3/2007 | Gueguen |
| 2007/0076810 A1 | 4/2007 | Herrera et al. |
| 2007/0099578 A1 | 5/2007 | Adeney et al. |
| 2007/0149229 A1 | 6/2007 | Frederiksen et al. |
| 2007/0153731 A1 | 7/2007 | Fine |
| 2007/0160162 A1 | 7/2007 | Kim et al. |
| 2007/0165738 A1 | 7/2007 | Barriac et al. |
| 2007/0201407 A1 | 8/2007 | Borran et al. |
| 2007/0217540 A1 | 9/2007 | Onggosanusi et al. |
| 2007/0223422 A1 | 9/2007 | Kim et al. |
| 2007/0223423 A1 | 9/2007 | Kim et al. |
| 2007/0230373 A1 | 10/2007 | Li et al. |
| 2007/0248068 A1 | 10/2007 | Onggosanusi et al. |
| 2007/0253386 A1 | 11/2007 | Li et al. |
| 2007/0270170 A1 | 11/2007 | Yoon et al. |
| 2008/0013610 A1 | 1/2008 | Varadarajan et al. |
| 2008/0025336 A1 | 1/2008 | Cho et al. |
| 2008/0039067 A1 | 2/2008 | Jin et al. |
| 2008/0043702 A1 | 2/2008 | Moon et al. |
| 2008/0049709 A1 | 2/2008 | Pan et al. |
| 2008/0080364 A1 | 4/2008 | Barak et al. |
| 2008/0080632 A1 | 4/2008 | Kim et al. |
| 2008/0080634 A1 | 4/2008 | Kotecha et al. |
| 2008/0080635 A1 | 4/2008 | Hugl et al. |
| 2008/0080637 A1 | 4/2008 | Khan et al. |
| 2008/0095258 A1 | 4/2008 | She et al. |
| 2008/0101407 A1 | 5/2008 | Khan et al. |
| 2008/0108310 A1 | 5/2008 | Tong et al. |
| 2008/0112351 A1 | 5/2008 | Surineni et al. |
| 2008/0130778 A1 | 6/2008 | Xia et al. |
| 2008/0144522 A1 | 6/2008 | Chang et al. |
| 2008/0165875 A1 | 7/2008 | Mundarath et al. |
| 2008/0186212 A1 | 8/2008 | Clerckx et al. |
| 2008/0192852 A1 | 8/2008 | Kent et al. |
| 2008/0198776 A1 | 8/2008 | Seo |
| 2008/0232494 A1 | 9/2008 | Pan et al. |
| 2008/0232503 A1 | 9/2008 | Kim |
| 2008/0247364 A1 | 10/2008 | Kim et al. |
| 2008/0247475 A1 | 10/2008 | Kim et al. |
| 2008/0268855 A1 | 10/2008 | Hanuni et al. |
| 2008/0268887 A1 | 10/2008 | Jansen et al. |
| 2008/0285433 A1 | 11/2008 | Akita et al. |
| 2008/0292013 A1 | 11/2008 | Varadarajan et al. |
| 2008/0298452 A1 | 12/2008 | Sampath et al. |
| 2008/0298482 A1 | 12/2008 | Rensburg et al. |
| 2008/0318606 A1 | 12/2008 | Tsutsui et al. |
| 2009/0011761 A1 | 1/2009 | Han et al. |
| 2009/0016263 A1 | 1/2009 | Kishigami et al. |
| 2009/0046800 A1 | 2/2009 | Xu et al. |
| 2009/0098876 A1 | 4/2009 | Khan et al. |
| 2009/0110114 A1 | 4/2009 | Onggosanusi et al. |
| 2009/0122857 A1 | 5/2009 | Li et al. |
| 2009/0161605 A1 | 6/2009 | Shen et al. |
| 2009/0180561 A1 | 7/2009 | Kim et al. |
| 2009/0245195 A1 | 10/2009 | Bhattad et al. |
| 2009/0247084 A1 | 10/2009 | Palanki |
| 2009/0252332 A1 | 10/2009 | Chang et al. |
| 2009/0252333 A1 | 10/2009 | Chang et al. |
| 2009/0282310 A1 | 11/2009 | Seok et al. |
| 2009/0296844 A1 | 12/2009 | Ihm et al. |
| 2009/0304109 A1 | 12/2009 | Kotecha |
| 2010/0009634 A1 | 1/2010 | Budianu et al. |
| 2010/0019631 A1 | 1/2010 | Olson |
| 2010/0031117 A1 | 2/2010 | Lee et al. |
| 2010/0034308 A1 | 2/2010 | Kim et al. |
| 2010/0035627 A1 | 2/2010 | Hou et al. |
| 2010/0054354 A1 | 3/2010 | Tosato |
| 2010/0056170 A1 | 3/2010 | Lindoff et al. |
| 2010/0061477 A1 | 3/2010 | Lee et al. |
| 2010/0067512 A1 | 3/2010 | Nam et al. |
| 2010/0069106 A1 | 3/2010 | Swarts et al. |
| 2010/0074301 A1 | 3/2010 | Howard et al. |
| 2010/0103834 A1 | 4/2010 | Gorokhov et al. |
| 2010/0113078 A1 | 5/2010 | Farajidana et al. |
| 2010/0158151 A1 | 6/2010 | Krauss et al. |
| 2010/0172424 A1 | 7/2010 | Perets et al. |
| 2010/0172430 A1 | 7/2010 | Melzer et al. |
| 2010/0173639 A1 | 7/2010 | Li et al. |
| 2010/0215112 A1 | 8/2010 | Tsai et al. |
| 2010/0220800 A1 | 9/2010 | Erell et al. |
| 2010/0238984 A1 | 9/2010 | Sayana et al. |
| 2010/0254474 A1 | 10/2010 | Gomadam et al. |
| 2010/0260234 A1 | 10/2010 | Thomas et al. |
| 2010/0260243 A1 | 10/2010 | Ihm et al. |
| 2010/0267341 A1 | 10/2010 | Bergel et al. |
| 2010/0271968 A1 | 10/2010 | Liu et al. |
| 2010/0272014 A1 | 10/2010 | Orlik et al. |
| 2010/0272032 A1 | 10/2010 | Sayana et al. |
| 2010/0273495 A1 | 10/2010 | Onggosanusi et al. |
| 2010/0273514 A1 | 10/2010 | Koo et al. |
| 2010/0278278 A1 | 11/2010 | Lee et al. |
| 2010/0284484 A1 | 11/2010 | Jongren et al. |
| 2010/0290548 A1 | 11/2010 | Hoshino et al. |
| 2010/0296603 A1 | 11/2010 | Lee et al. |
| 2010/0309861 A1 | 12/2010 | Gorokhov et al. |
| 2011/0013710 A1 | 1/2011 | Xiao |
| 2011/0026413 A1 | 2/2011 | Swarts et al. |
| 2011/0034175 A1 | 2/2011 | Fong et al. |
| 2011/0034192 A1 | 2/2011 | Lim et al. |
| 2011/0044193 A1 | 2/2011 | Forenza et al. |
| 2011/0058621 A1 | 3/2011 | Clerckx et al. |
| 2011/0064156 A1 | 3/2011 | Kim et al. |
| 2011/0077038 A1 | 3/2011 | Montojo et al. |
| 2011/0080969 A1 | 4/2011 | Jongren et al. |
| 2011/0085610 A1 | 4/2011 | Zhuang et al. |
| 2011/0086663 A1 | 4/2011 | Gorokhov et al. |
| 2011/0096704 A1 | 4/2011 | Erell et al. |
| 2011/0103534 A1 | 5/2011 | Axmon et al. |
| 2011/0110403 A1 | 5/2011 | Jongren |
| 2011/0110450 A1 | 5/2011 | Gomadam et al. |
| 2011/0134774 A1 | 6/2011 | Pelletier et al. |
| 2011/0150052 A1 | 6/2011 | Erell et al. |
| 2011/0158190 A1 | 6/2011 | Kuwahara et al. |
| 2011/0164701 A1 | 7/2011 | Nikopourdeilami et al. |
| 2011/0170435 A1 | 7/2011 | Kim et al. |
| 2011/0170638 A1 | 7/2011 | Yuan et al. |
| 2011/0176439 A1 | 7/2011 | Mondal et al. |
| 2011/0188393 A1 | 8/2011 | Mallik et al. |
| 2011/0194594 A1 | 8/2011 | Noh et al. |
| 2011/0194638 A1 | 8/2011 | Erell et al. |
| 2011/0194644 A1 | 8/2011 | Liu et al. |
| 2011/0199986 A1 | 8/2011 | Fong et al. |
| 2011/0205930 A1 | 8/2011 | Rahman et al. |
| 2011/0216846 A1 | 9/2011 | Lee et al. |

(56) References Cited

U.S. PATENT DOCUMENTS

| | | |
|---|---|---|
| 2011/0235608 A1 | 9/2011 | Koo et al. |
| 2011/0250919 A1 | 10/2011 | Barbieri et al. |
| 2011/0261775 A1 | 10/2011 | Kim et al. |
| 2011/0268204 A1 | 11/2011 | Choi et al. |
| 2011/0274188 A1 | 11/2011 | Sayana et al. |
| 2011/0306341 A1 | 12/2011 | Klein et al. |
| 2012/0002568 A1 | 1/2012 | Tiirola et al. |
| 2012/0002743 A1 | 1/2012 | Cavalcante et al. |
| 2012/0003926 A1 | 1/2012 | Coldrey et al. |
| 2012/0008556 A1 | 1/2012 | Noh et al. |
| 2012/0020433 A1 | 1/2012 | Bhattad et al. |
| 2012/0028628 A1 | 2/2012 | Frenger et al. |
| 2012/0033592 A1 | 2/2012 | Kim et al. |
| 2012/0033630 A1 | 2/2012 | Chung et al. |
| 2012/0034927 A1 | 2/2012 | Papasakellariou et al. |
| 2012/0039369 A1 | 2/2012 | Choi et al. |
| 2012/0058735 A1 | 3/2012 | Vermani et al. |
| 2012/0063336 A1 | 3/2012 | Shany et al. |
| 2012/0069887 A1 | 3/2012 | Park et al. |
| 2012/0069917 A1 | 3/2012 | Liu et al. |
| 2012/0076028 A1 | 3/2012 | Ko et al. |
| 2012/0076038 A1 | 3/2012 | Shan et al. |
| 2012/0087425 A1 | 4/2012 | Gomadam et al. |
| 2012/0087435 A1 | 4/2012 | Gomadam et al. |
| 2012/0134434 A1 | 5/2012 | Chen et al. |
| 2012/0188976 A1 | 7/2012 | Kim et al. |
| 2012/0213261 A1 | 8/2012 | Sayana et al. |
| 2012/0219042 A1 | 8/2012 | Onggosanusi et al. |
| 2012/0219083 A1 | 8/2012 | Tong et al. |
| 2012/0250550 A1 | 10/2012 | Gomadam et al. |
| 2012/0257664 A1 | 10/2012 | Yue et al. |
| 2012/0275376 A1 | 11/2012 | Sampath et al. |
| 2012/0275386 A1 | 11/2012 | Frenne et al. |
| 2012/0281620 A1 | 11/2012 | Sampath et al. |
| 2012/0287799 A1* | 11/2012 | Chen et al. ............... 370/252 |
| 2012/0329502 A1 | 12/2012 | Frederiksen et al. |
| 2013/0028068 A1 | 1/2013 | Park et al. |
| 2013/0028344 A1 | 1/2013 | Chen et al. |
| 2013/0039284 A1 | 2/2013 | Marinier et al. |
| 2013/0051256 A1 | 2/2013 | Ong et al. |
| 2013/0077595 A1 | 3/2013 | Aiba et al. |
| 2013/0083681 A1 | 4/2013 | Ebrahimi Tazeh Mahalleh et al. |
| 2013/0088978 A1 | 4/2013 | Mondal et al. |
| 2013/0107916 A1 | 5/2013 | Liu et al. |
| 2013/0114427 A1 | 5/2013 | Maattanen et al. |
| 2013/0114428 A1 | 5/2013 | Koivisto et al. |
| 2013/0114431 A1 | 5/2013 | Koivisto |
| 2013/0128847 A1 | 5/2013 | Wang et al. |
| 2013/0176991 A1 | 7/2013 | Yi |
| 2013/0182786 A1 | 7/2013 | Frenne et al. |
| 2013/0250885 A1* | 9/2013 | Davydov et al. ............ 370/329 |
| 2013/0272221 A1 | 10/2013 | Hoehne et al. |
| 2014/0029568 A1 | 1/2014 | Wang et al. |
| 2014/0029586 A1 | 1/2014 | Loehr et al. |
| 2014/0051357 A1 | 2/2014 | Steer et al. |

FOREIGN PATENT DOCUMENTS

| | | |
|---|---|---|
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008133582 A2 | 11/2008 |
| WO | 2009116471 A1 | 9/2009 |
| WO | 2010013950 A2 | 2/2010 |
| WO | 2011147692 A1 | 12/2011 |

OTHER PUBLICATIONS

U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
U.S. Appl. No. 13/610,904, filed Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
JP Patent Application # 2011-544111 Official Action dated Nov. 6, 2012.
U.S. Appl. No. 13/669,476, filed Nov. 6, 2012.
U.S. Appl. No. 13/669,477, filed Nov. 6, 2012.
Alcatel-Lucent et al., "Way Forward on Enhancement for Rel.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
U.S. Appl. No. 13/409,130, filed Mar. 1, 2012.
U.S. Appl. No. 12/652,044 Official Action dated Feb. 7, 2012.
Alcatel-Lucent et al., "Way Forward on 8Tx Codebook for Rel.10 DL MIMO", 3GPP TSG RAN WG1 62, Madrid, Spain, Aug. 23-27, 2010.
Huang et al. "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT DoCoMo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
U.S. Appl. No. 61/585,556, filed Jan. 11, 2012.
U.S. Appl. No. 12/965,878 Official Action dated Apr. 1, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
U.S. Appl. No. 13/669,476 Office Action dated Mar. 31, 2014.
U.S. Appl. No. 14/179,593 Office Action dated Apr. 9, 2014.
U.S. Appl. No. 12/903,237 Office Action dated Feb. 27, 2014.
JP Application # 2012537460 Office Action dated Jan. 21, 2014.
NTT DoCoMo, 3GPP TSG RAN WG1, "Views on Scalable CSI Feedback for DL CoMP in LTE-Advanced" , Meeting #58bis, R1-094243, pp. 1-5, Oct. 12-16, 2009.
NTT DoCoMo, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
U.S. Appl. No. 13/669,477 Official Action dated Apr. 14, 2014.

(56) References Cited

OTHER PUBLICATIONS

Japanese Patent Application # 2011-544111 Office Action dated Mar. 12, 2013.
U.S. Appl. No. 13/252,218 Office Action dated Apr. 11, 2013.
ZTE, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
U.S. Appl. No. 12/965,878 Office Action dated Oct. 24, 2013.
U.S. Appl. No. 13/052,075 Notice of Allowance dated Nov. 8, 2013.
U.S. Appl. No. 12/965,878 Notice of Allowance dated Feb. 10, 2014.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4x2 and 4x4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16—2001, IEEE Computer Society and IEE Microwave Theory and Techniques Society, USA, Oct. 1, 2004.
NTT DoCoMo et al., "Prioritized Deployment Scenarios for LTE-Advanced Studies", 3GPP TSG RAN WG4 Meeting # 50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8x8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research In Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).
Qualcomm Europe, Notion of Anchor Carrier in LTE-A, 3GPP TSG RAN WG1 Meeting #55-bis, Ljubljana, Slovenia, Jan. 12-16, 2009 (R1-080356).
Samsung, "UL Transmission Power Control in LTE-A", 3GPP TSG RAN WG1 Meeting #56bis, Seoul, Korea, Mar. 23-27, 2009 (R1-091250).
International Application PCT/IB2010/055763 Search Report dated Jun. 14, 2011.

(56) References Cited

OTHER PUBLICATIONS

International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.
U.S. Appl. No. 13/543,835 Office Action dated Nov. 22, 2013.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT DoCoMo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 61/294,737, filed Mar. 13, 2010.
U.S. Appl. No. 12/902,168, filed Oct. 12, 2010.
U.S. Appl. No. 12/903,237, filed Oct. 13, 2010.
Alcatel-Lucent "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Marvell, "Details of PUCCH 1-1 for 8Tx", 3GPP TSG RAN # 63, Jacksonville, USA, Nov. 15-19, 2010.
U.S. Appl. No. 13/346,737, filed Jan. 10, 2012.
Ericsson et al., "Way Forward for Rel-10 Feedback Framework", 3GPP TSG RAN WG1 Meeting #60, San Francisco, USA, Feb. 22-22, 2010.
Shenzhen, "Adaptive Feedback: A New Perspective of the Adaptive Codebook", 3GPP TSG RAN WG1 meeting #58, Shenzhen, China, Aug. 24-28, 2009.
Motorola, Interference Mitigation via Power Control and FSM Resource Allocation and UE Alignment for E-UTRA Uplink and TP 3 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT DoCoMo), "Text Proposal for RAN1 TR on LTE Advanced", 3GPP TSG RAN WG1 Meeting #53bis, Warsaw, Poland, Jun. 30-Jul. 4, 2008.
Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TSG-RAN WGI #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.

(56) References Cited

OTHER PUBLICATIONS

Marvell, "Two-Component PMI Codebook for 8TX", 3GPP TSG RAN # 62 Meeting, Madrid, Spain, Aug. 23-27, 2010.
U.S. Appl. No. 13/610,904 Office Action dated May 1, 2014.
U.S. Appl. No. 13/433,293 Office Action dated Jun. 24, 2014.
JP Patent Application # 2011-551560 Office Action dated Oct. 29, 2013.
JP Patent Application # 2012-506601 Office Action dated Oct. 22, 2013.
U.S. Appl. No. 13/610,904 Office Action dated Oct. 7, 2014.
European Application # 12765629 Search Report dated Aug. 5, 2014.
U.S. Appl. No. 13/346,737 Office Action dated Dec. 24, 2014.
U.S. Appl. No. 13/610,904 Office Action dated Mar. 4, 2015.
U.S. Appl. No. 13/862,422 Office Action dated Feb. 12, 2015.

* cited by examiner

DIFFERENTIAL CQI ENCODING FOR COOPERATIVE MULTIPOINT FEEDBACK

CROSS-REFERENCE TO RELATED APPLICATIONS

This application claims the benefit of U.S. Provisional Patent Application 61/558,405, filed Nov. 10, 2011, whose disclosure is incorporated herein by reference.

FIELD OF THE DISCLOSURE

The present invention relates generally to wireless communication, and particularly to methods and systems for Multiple-Input Multiple-Output (MIMO) channel feedback.

BACKGROUND

In some MIMO communication systems, multiple cells use Cooperative Multipoint (CoMP) transmission schemes for coordinating downlink MIMO transmissions to User Equipment (UEs). Third Generation Partnership Project (3GPP) Long Term Evolution—Advanced (LTE-A) systems, for example, use or contemplate the use of multiple CoMP modes such as Dynamic Point Selection (DPS), Dynamic Point Blanking (DPB), Cooperative beamforming (CB) and Joint Transmission (JT). The CoMP modes used in LTE-A are specified, for example, in "3rd Generation Partnership Project; Technical Specification Group Radio Access Network; Coordinated multi-point operation for LTE physical layer aspects (Release 11)," 3GPP TR 36.819, version 11.0.0, September, 2011, which is incorporated herein by reference. When using CoMP, the cooperating cells typically configure their transmissions based on channel feedback provided by the UEs.

The description above is presented as a general overview of related art in this field and should not be construed as an admission that any of the information it contains constitutes prior art against the present patent application.

SUMMARY

An embodiment that is described herein provides a method including receiving in a mobile communication terminal signals from multiple cells that coordinate transmission of the signals with one another in a Cooperative Multipoint (CoMP) scheme. At least first and second Channel Quality Indicators (CQIs), for respective communication channels over which the signals are received, are calculated in the terminal based on the received signals. The second CQI is differentially encoded relative to the first CQI. Feedback information, including the first CQI and the differentially-encoded second CQI, is transmitted from the terminal.

In some embodiments, calculating the CQIs includes identifying a strongest cell, whose signals are received in the terminal with a strongest signal strength among the multiple cells, and calculating the first CQI for a communication channel from the strongest cell to the terminal. In an embodiment, calculating the CQIs includes calculating the first and second CQIs for respective first and second communication channels from first and second ones of the cells to the terminal.

In a disclosed embodiment, calculating the CQIs includes calculating one of the first and second CQIs for a communication channel from one of the cells to the terminal, and calculating the other of the first and second CQIs for an aggregate communication channel from the multiple cells to the terminal. In another embodiment, calculating the CQIs includes calculating the first or the second CQI for a communication channel from one of the cells that is designated for fallback to single-transmission-point transmission to the terminal.

In yet another embodiment, differentially encoding the second CQI includes encoding a difference between the second CQI and the first CQI, such that the differentially-encoded second CQI includes a smaller number of bits than the second CQI. In still another embodiment, differentially encoding the second CQI includes representing the differentially-encoded second CQI using no more than three bits. In an alternative embodiment, differentially encoding the second CQI includes representing the differentially-encoded second CQI using no more than two bits.

There is additionally provided, in accordance with an embodiment that is described herein, apparatus including a receiver, processing circuitry and a transmitter. The receiver is configured to receive signals from multiple cells that coordinate transmission of the signals with one another in a Cooperative Multipoint (CoMP) scheme. The processing circuitry is configured to calculate, based on the received signals, at least first and second Channel Quality Indicators (CQIs) for respective communication channels over which the signals are received, and to differentially encode the second CQI relative to the first CQI. The transmitter is configured to transmit feedback information including the first CQI and the differentially-encoded second CQI.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

In a typical CoMP system, a group of cells in a suitable wireless communication network, such as a cellular network, transmits downlink MIMO signals to mobile communication terminals in coordination. The cells, or a central scheduler, configure the downlink signals based on channel feedback that is provided by the terminals.

In various CoMP modes, the terminal calculates and reports feedback for multiple communication channels, e.g., for each individual cell in the group and/or for the aggregate MIMO channel from the entire group of cells. The feedback typically comprises parameters such as Channel Quality Indicators (CQIs) for the various channels. Channel feedback of this sort is often of considerable data size, and reporting channel feedback for the various channels consumes considerable signaling resources on the uplink channels of the system.

Embodiments that are described herein provide improved channel feedback schemes for use in CoMP MIMO systems. In some embodiments, instead of reporting the actual multiple CQI values, the terminal encodes one or more of the CQIs differentially. In a typical differential encoding scheme, the terminal provides a data rich report of the actual value of some reference CQI, and the differences between the other CQIs and the reference CQI. Since in many CoMP scenarios the differences between the various CQIs are small, reporting the CQIs using differential encoding can be carried out using a small number of bits and with little or no performance degradation.

When using the disclosed schemes, high-quality feedback can be provided to the different cells in a CoMP network system using modest uplink signaling resources. Several examples of feedback schemes that use differential encoding of CQI, for use in various CoMP modes, are described below. The embodiments described herein refer mainly to Joint Transmission (JT) CoMP. The disclosed techniques, however, are also applicable in other CoMP modes such as CB or DPS.

Figure 1:
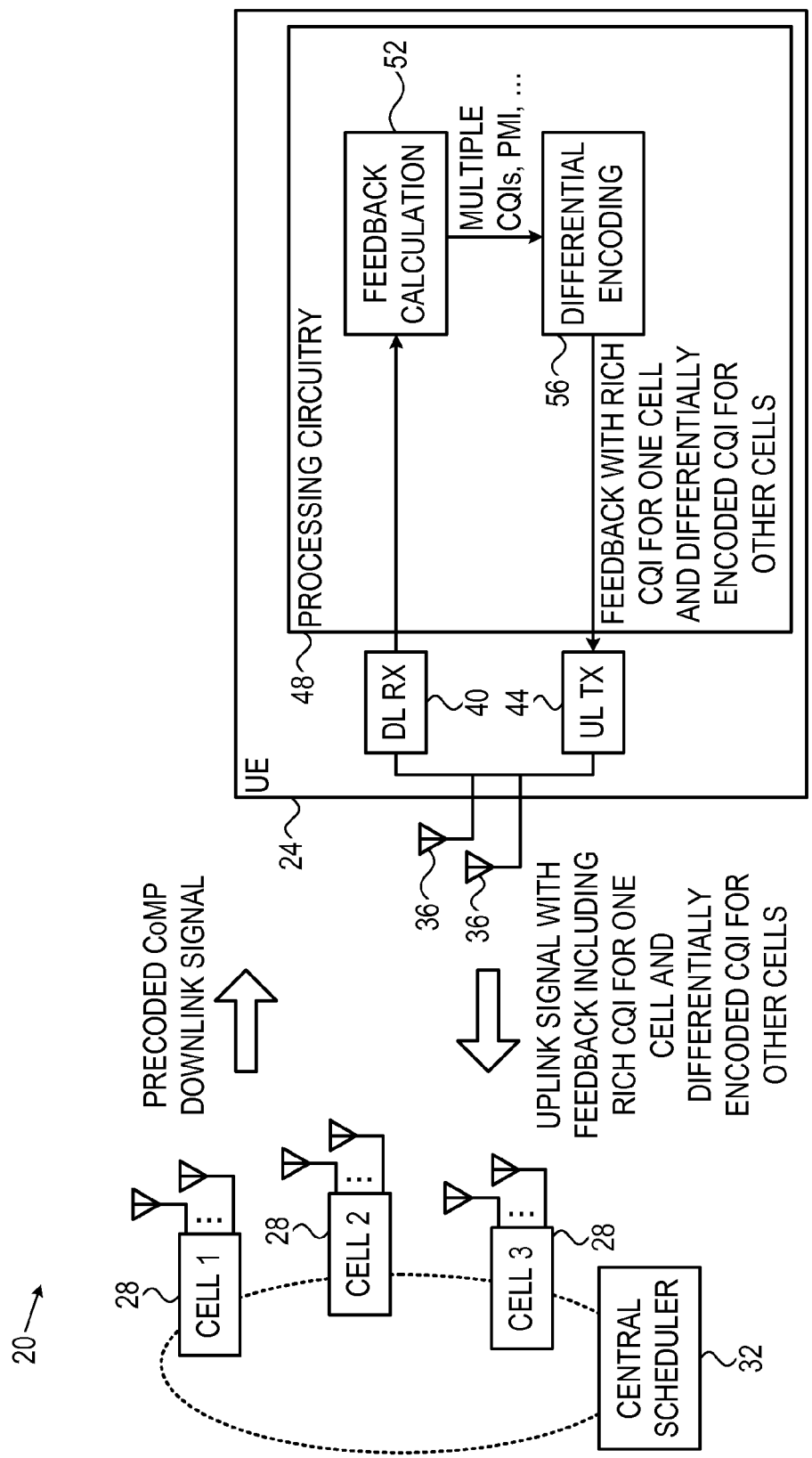
FIG. 1 is a block diagram that schematically illustrates a MIMO communication system that uses CoMP, in accordance with an embodiment that is described herein.

FIG. 1 is a block diagram that schematically illustrates a Cooperative Multipoint (CoMP) communication system 20, in accordance with an embodiment that is described herein. In the present example, system 20 operates in accordance with Third Generation Partnership Project (3GPP) Long Term Evolution—Advanced (LTE-A) specifications. In alternative embodiments, system 20 may operate in accordance with any other suitable communication protocol in which cells coordinate transmission with one another, such as, for example, WiMAX.

In the embodiment of FIG. 1, system 20 comprises a mobile communication terminal 24 (referred to in LTE-A terminology as User Equipment—UE) and three cells 28 (base stations) denoted CELL1, CELL2 and CELL3. The terms cell, base station and Transmission Point (TP) are used interchangeably herein. The choice of a single UE and three cells is made purely by way of example. In real-life configurations, system 20 typically comprises a large number of cells, some of which may be collocated, and a large number of terminals. Each UE 24 comprises, for example, a cellular phone, a wireless-enabled computing device or any other suitable type of communication terminal.

Cells 28 cooperate with one another in transmitting precoded (i.e., beamformed) signals to UEs 24. Depending on the CoMP mode or on other factors, the cells may cooperate in beamforming, beam activation and deactivation, transmission scheduling or other tasks. A group of cells that cooperate in this manner, such as CELL1, CELL2 and CELL3, is referred to as a cooperating set. In various embodiments, cells 28 may use CoMP modes such as DPS, DPB, JT, CB, and possibly alternate between different modes over time.

In the present embodiment, system 20 comprises a central scheduler 32, which schedules the transmissions of the various cells to the various UEs, and calculates precoding vectors (i.e., sets of complex weights to be applied to the signals transmitted via the respective transmit antennas of the cells) to be applied by the cells when transmitting the CoMP transmissions, in an embodiment. In some embodiments the central scheduler also selects the appropriate CoMP mode, and the cell or cells in the set that will transmit to a UE.

Central scheduler 32 typically selects the CoMP mode, the transmitting cell or cells, and/or the precoding vectors, based on channel feedback that is received from the UEs. In some embodiments, the UEs encode at least part of their channel feedback using differential encoding, as will be explained in detail further below.

In the embodiment of FIG. 1, UE 24 comprises one or more antennas 36, a downlink receiver (DL RX) 40, an uplink transmitter (UL TX) 44, and processing circuitry 48. Receiver 40 receives downlink signals from cells 28 via antennas 36. Processing circuitry 48 processes the received signals. Among other tasks, processing circuitry 48 calculates the channel feedback for various communication channels over which downlink signals are transmitted to the UE, and formats the feedback information to be transmitted to cells 28. Processing circuitry 48 provides the feedback information to uplink transmitter 44, which transmits the feedback information to cells 28.

In the present embodiment, processing circuitry 48 comprises a feedback calculation module 52, which uses calculates the channel feedback using one or more received downlink signals. A differential encoding module 56 applies differential encoding to at least part of the channel feedback, e.g., to Channel Quality Indicators (CQI) estimated by module 52 for the different cells. Module 56 formats the feedback information, including the differentially-encoded CQI.

In some embodiments, each Transmission Point (TP) in the group of cooperating cells transmits respective reference signals, and UE 24 calculates the channel feedback by measuring the reference signals. These reference signals are referred to as Channel State Information Reference Signals (CSI-RS), and each cell is also referred to as a CSI-RS resource.

The UE configuration seen in FIG. 1 is an example configuration, which is depicted in a highly simplified manner solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including receiver 40, transmitter 44 and processing circuitry 48, are implemented in hardware, such as implementing receiver 40 and/or transmitter 44 using one or more Radio Frequency Integrated Circuits (RFICs), or implementing processing circuitry 48 using one or more Field-Programmable Gate Arrays (FPGAs) or Application-Specific Integrated Circuits (ASICs). In alternative embodiments, various elements of UE 24 are implemented in software, or using a combination of hardware and software elements.

In some embodiments, various UE elements, such as various elements of processing circuitry 48, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

In some embodiments, cells 28 transmit signals to UE 24 using Joint Transmission (JT) CoMP. In this mode, multiple cells 28 transmit the same data jointly to the UE, so as to effectively produce a large-baseline MIMO transmission from the transmit antennas of the multiple cells.

In various embodiments, system 20 may use various feedback schemes when operating in the JT CoMP mode. Example feedback schemes are referred to herein as individual feedback, aggregated feedback and combined feedback. When using individual feedback, the UE calculates and reports the following feedback information:

Respective Precoding Matrix Indicator (PMI) for each CSI-RS resource.

Respective Channel Quality Indicator (CQI) for each CSI-RS resource.

Relative phases between the CSI-RS resources.

In an embodiment, UE 24 calculates and reports these parameters per spectral sub-band. Without differential encoding, and assuming an allocation of four bits for each CQI, four bits for each PMI and two bits for each inter-CSI-RS phase, the total signaling overhead is $4n+4n+2(n-1)$ bits per sub-band, wherein n denotes the number of CSI-RS resources in the group.

The aggregated feedback scheme typically refers to the aggregated or composite MIMO channel from the transmit antennas of the entire group of cooperating cells. When using aggregated feedback, the UE calculates and reports the following feedback information:

Respective PMI for each CSI-RS resource.
Aggregated CQI for the aggregated MIMO channel between all the CSI-RS resources and the UE.
A single CQI (referred to as single-TP CQI) for one of the CSI-RS resources, for use in case of fallback to non-CoMP transmission (i.e., for cases where for some reason system 20 stops using CoMP for transmitting to the UE and reverts to single-TP transmission).
Relative phases between the CSI-RS resources.
Index of the CSI-RS resource whose single-TP CQI is reported.

In an embodiment, these parameters are calculated and reported per spectral sub-band. Without differential encoding, and assuming an allocation of four bits for each PMI, four bits for the aggregated CQI, four bits for the single-TP CQI and two bits for each inter-CSI-RS phase, the total signaling overhead is $4n+4+4+2(n-1)+2$ bits per sub-band.

The combined feedback typically comprises a hybrid scheme that reports one or more parameters related to individual feedback, and one or more parameters related to aggregated feedback. When using combined feedback, UE 24 calculates and reports the following feedback information:

Respective PMI for each CSI-RS resource.
Aggregated CQI for the aggregated MIMO channel between all the CSI-RS resources and the UE.
Respective Channel Quality Indicator (CQI) for each CSI-RS resource.
Relative phases between the CSI-RS resources.

In an embodiment, The UE calculates and reports these parameters per spectral sub-band. Without differential encoding, and assuming an allocation of four bits for each PMI, four bits for the aggregated CQI and two bits for each inter-CSI-RS phase, the total signaling overhead is $4n+4n+4+2(n-1)$ bits per sub-band.

The three feedback schemes described above are chosen and defined solely by way of example. In alternative embodiments, the disclosed techniques can be used with any other suitable feedback scheme that reports any other suitable parameters.

As can be seen in the examples above, the feedback information in CoMP comprises a large number of bits, which consume considerable signaling resources on the uplink channels from UE 24 to cells 28. A large portion of this feedback overhead relates to reporting the multiple CQIs. The overhead is particularly problematic when the number of cooperating cells in the group is large.

In many practical CoMP scenarios, however, the multiple CQIs reported by the UE in a given feedback report have similar values. (In an embodiment, the CQI computed for a certain cell comprises an integer number that indicates the preferred Modulation and Coding Scheme (MCS) to be used by that cell. The CQI is roughly correlative to the signal-to-noise-and-interference ratio of the signal received from the cell.)

In some embodiments, processing circuitry 48 of UE 24 exploits the small differences between the CQIs of the various channels to reduce uplink signaling, by using differential encoding. In these embodiments, differential encoding module 56 applies differential encoding to the CQIs calculated by feedback calculation module 52. Typically, module 56 selects one of the CQIs to serve as a reference CQI. When formulating the feedback information, module 56 reports full, rich, un-encoded CQI report for the reference CQI, e.g., the actual value of the reference CQI, and the differences between the other CQIs and the reference CQI. In various embodiments, any of the cooperating cells can be selected as the cell whose CQI serves as the reference CQI.

In the embodiments described herein, module 56 identifies the strongest CQI (i.e., the CQI of the CSI-RS resource that is received with the strongest signal strength among the CSI-RS resources in the cooperating group of cells), and chooses this strongest CQI to serve as the reference CQI. Alternatively, however, module 56 may choose any other CQI of any other cell to serve as the reference CQI.

In the context of the present patent application and in the claims, the term "difference between CQIs" refers to any suitable way of expressing the variation or delta between the CQIs, including, for example and without limitation, additive or multiplicative differences.

Because of the small differences between the CQI values, it is possible to allocate to the differentially-encoded CQIs only a small number of bits with little or no loss of information. The set of differential CQI values is typically chosen based on the range of CQI differences among the various CSI-RS resources, and/or the typical differences between the aggregated and single-TP CQIs. In some embodiments that are described below, module 56 represents each differentially-encoded CQI using three bits. In other disclosed embodiments, module 56 represents each differentially-encoded CQI using only two bits. Further alternatively, any other suitable number of bits can be used for representing the differentially-encoded CQIs.

In an example embodiment, when using individual feedback, module 56 produces the following feedback information:

CQI for the strongest CSI-RS resource (used as reference CQI), and the index of this CSI-RS resource.
Differentially-encoded CQIs for the other CSI-RS resources.

In an embodiment, module 56 reports each differentially-encoded CQI using two bits, according to the following table:

TABLE 1

Example 2-bit differential encoding of CQI

| Difference in CQI index from reference CQI | Differentially-encoded CQI in feedback information |
|---|---|
| 0 | 0 |
| −1 | 1 |
| −2 | 2 |
| ≤−3 | 3 |

In this embodiment, the total signaling overhead is $4n+4+2(n-1)+2+2(n-1)$ bits per sub-band, in comparison with $4n+4n+2(n-1)$ bits per sub-band without differential encoding. The overhead reduction is $2n-4$ bits per sub-band, which is a considerable reduction.

In an alternative embodiment relating to individual feedback, module 56 reports each differentially-encoded CQI using three bits, according to the following table:

TABLE 2

Example 3-bit differential encoding of CQI

| Difference in CQI index from reference CQI | Differentially-encoded CQI in feedback information |
|---|---|
| 0 | 0 |
| −1 | 1 |
| −2 | 2 |
| −3 | 3 |
| −4 | 4 |
| −5 | 5 |
| −6 | 6 |
| ≤−7 | 7 |

In this embodiment, the total signaling overhead is 4n+4+3(n−1)+2+2(n−1) bits per sub-band, in comparison with 4n+4n+2(n−1) bits per sub-band without differential encoding. The overhead reduction is thus n−3 bits per sub-band.

In an example embodiment, when using aggregated feedback, module 56 produces the following feedback information:
  Aggregated CQI used as reference CQI.
  Differentially-encoded single-TP CQI for one of the CSI-RS resources, for use in case of fallback to non-CoMP operation.
  Index of the CSI-RS resource whose single-TP CQI is reported.

In an alternative embodiment relating to aggregated feedback, module 56 produces the following feedback information:
  Single-TP CQI for one of the CSI-RS resources, for use in case of fallback to non-CoMP operation, used as reference CQI.
  Differentially-encoded aggregated CQI.
  Index of the CSI-RS resource whose single-TP CQI is reported.

In these embodiments, module 56 reports the differentially-encoded CQI using three bits according to Table 2 above, or using two bits according to Table 1 above. The total signaling overhead is 4n+4+3+2(n−1)+2 (the extra 2 bits for index of the CSI-RS resource whose single-TP CQI is reported) bits per sub-band for Table 1 (differential encoding with three bits), or 4n+4+2+2(n−1)+2 bits per sub-band for Table 2 (differential encoding with two bits), providing a saving of 2 bits or 1 bits per sub-band, respectively.

In another example embodiment, when using combined feedback, module 56 produces the following feedback information:
  Aggregated CQI used as reference CQI.
  Differentially-encoded CQI for each CSI-RS resource.

In this embodiment, module 56 reports the differentially-encoded CQI using three bits according to Table 1 above, or using two bits according to Table 2 above. The total signaling overhead is 4n+2n+2(n−1)+4 bits per sub-band for Table 2 (differential encoding with three bits), or 4n+3n+2(n−1)+4 bits per sub-band for Table 1 (differential encoding with two bits), providing a saving of 2n bits or n bits per sub-band, respectively.

In an alternative embodiment relating to combined feedback, module 56 produces the following feedback information:
  CQI of strongest CSI-RS resource, used as reference CQI.
  Differentially-encoded aggregated CQI.
  Differentially-encoded CQI for each CSI-RS resource other than the strongest (reference) CSI-RS resource.
  Index of the strongest CSI-RS resource.

In this embodiment, module 56 may report each differentially-encoded CQIs (single-TP or aggregated) using two bits according to the following table:

TABLE 3

Example 2-bit differential encoding of CQI

| Difference in CQI index from reference CQI | Differentially-encoded CQI in feedback information |
|---|---|
| 0 | 0 |
| 1 | 1 |
| ≥2 | 2 |
| ≤−1 | 3 |

Alternatively, module 56 may report each differentially-encoded CQIs (single-TP or aggregated) using three bits according to the following table:

TABLE 4

Example 3-bit differential encoding of CQI

| Difference in CQI index from reference CQI | Differentially-encoded CQI in feedback information |
|---|---|
| 0 | 0 |
| 1 | 1 |
| 2 | 2 |
| 3 | 3 |
| ≥4 | 4 |
| −1 | 5 |
| −2 | 6 |
| ≤−3 | 7 |

The total signaling overhead in these embodiments is 4n+2n+2(n−1)+6 bits per sub-band for Table 3 (differential encoding with three bits), or 4n+3n+2(n−1)+6 bits per sub-band for Table 4 (differential encoding with two bits), providing a saving of 2n−2 bits or n−2 bits per sub-band, respectively.

The differential encoding tables and feedback formats described above are given purely by way of example. In alternative embodiments, module 56 in UE 24 may use any other suitable differential encoding values and feedback formats.

Figure 2:
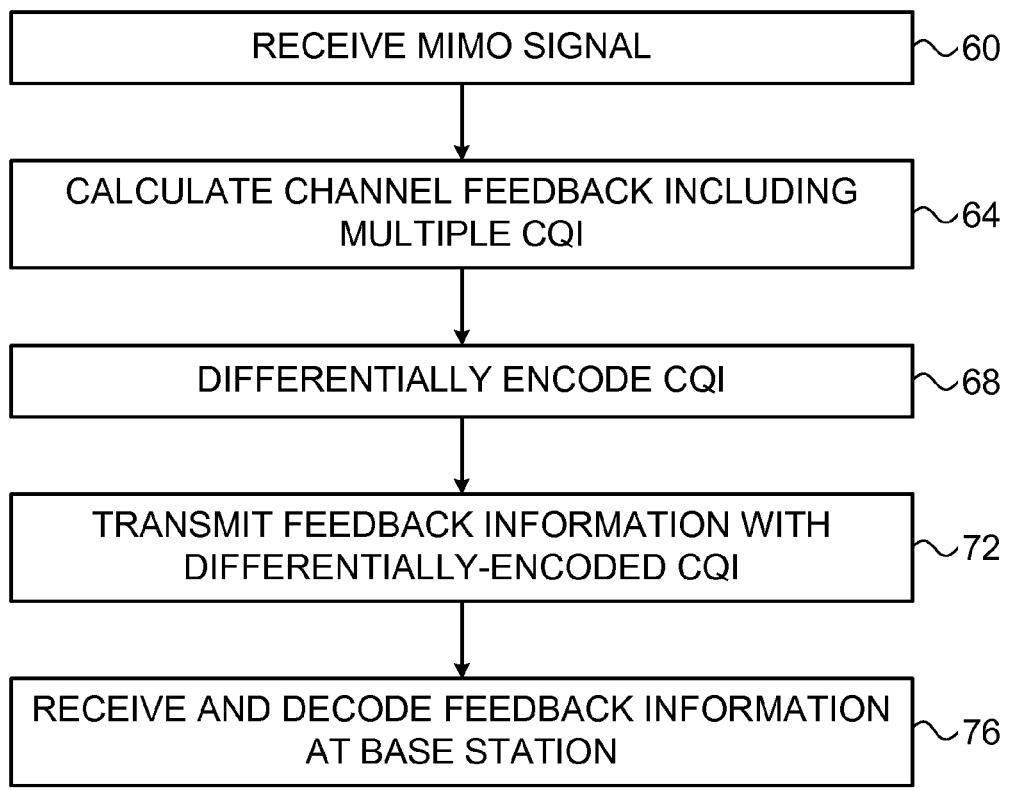
FIG. 2 is a flow chart that schematically illustrates a method for channel feedback in a MIMO communication system that uses CoMP, in accordance with an embodiment that is described herein.

FIG. 2 is a flow chart that schematically illustrates a method for channel feedback in system 20, in accordance with an embodiment that is described herein. The method begins with receiver 40 of UE 24 receiving a CoMP MIMO signal from cells 28, at a downlink reception operation 60.

Feedback calculation module 52 in processing circuitry 48 calculates channel feedback based on the received CoMP signal, at a feedback calculation operation 64. The feedback information comprises at least two CQI values, as explained above. Differential encoding module 56 applies differential encoding to all but one of the CQI values, at an encoding operation 68, to produce feedback information for feeding back to cells 28. As explained above, one of the CQIs is selected to serve as a reference CQI for which a rich CQI report is transmitted. The other CQIs are differentially-encoded relative to the reference CQI.

Transmitter 44 transmits the feedback information, including the differentially-encoded CQI, to cells 28, at an uplink transmission operation 72. Cells 28 and/or central scheduler 32 receive and decode the feedback information, at a feedback reception operation 76. The cells and/or central scheduler use the feedback information for configuring subsequent CoMP transmission to the UE.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving in a mobile communication terminal signals from multiple cells that coordinate transmission of the signals with one another in a Cooperative Multipoint (CoMP) scheme;
calculating in the terminal, based on the received signals, at least first and second Channel Quality Indicators (CQIs) for respective communication channels over which the signals are received, wherein the first or the second CQI is calculated for a communication channel from one of the cells that is designated for fallback to single-transmission-point transmission to the terminal;
differentially encoding the second CQI relative to the first CQI; and
transmitting feedback information, comprising the first CQI and the differentially-encoded second CQI, from the terminal.

2. The method according to claim 1, wherein calculating the CQIs comprises identifying a strongest cell, whose signals are received in the terminal with a strongest signal strength among the multiple cells, and calculating the first CQI for a communication channel from the strongest cell to the terminal.

3. The method according to claim 1, wherein calculating the CQIs comprises calculating the first and second CQIs for respective first and second communication channels from first and second ones of the cells to the terminal.

4. The method according to claim 1, wherein calculating the CQIs comprises calculating one of the first and second CQIs for a communication channel from one of the cells to the terminal, and calculating the other of the first and second CQIs for an aggregate communication channel from the multiple cells to the terminal.

5. The method according to claim 1, wherein differentially encoding the second CQI comprises encoding a difference between the second CQI and the first CQI, such that the differentially-encoded second CQI comprises a smaller number of bits than the second CQI.

6. The method according to claim 1, wherein differentially encoding the second CQI comprises representing the differentially-encoded second CQI using no more than three bits.

7. The method according to claim 1, wherein differentially encoding the second CQI comprises representing the differentially-encoded second CQI using no more than two bits.

8. Apparatus, comprising:
a receiver, which is configured to receive signals from multiple cells that coordinate transmission of the signals with one another in a Cooperative Multipoint (CoMP) scheme;
processing circuitry, which is configured to calculate, based on the received signals, at least first and second Channel Quality Indicators (CQIs) for respective communication channels over which the signals are received, wherein the first or the second CQI is calculated for a communication channel from one of the cells that is designated for fallback to single-transmission-point transmission to the receiver, and to differentially encode the second CQI relative to the first CQI; and
a transmitter, which is configured to transmit feedback information comprising the first CQI and the differentially-encoded second CQI.

9. The apparatus according to claim 8, wherein the processing circuitry is configured to identify a strongest cell, whose signals are received in the receiver with a strongest signal strength among the multiple cells, and to calculate the first CQI for a communication channel from the strongest cell to the receiver.

10. The apparatus according to claim 8, wherein the processing circuitry is configured to calculate the first and second CQIs for respective first and second communication channels from first and second ones of the cells to the receiver.

11. The apparatus according to claim 8, wherein the processing circuitry is configured to calculate one of the first and second CQIs for a communication channel from one of the cells to the receiver, and to calculate the other of the first and second CQIs for an aggregate communication channel from the multiple cells to the receiver.

12. The apparatus according to claim 8, wherein the processing circuitry is configured to differentially encode the second CQI by encoding a difference between the second CQI and the first CQI, such that the differentially-encoded second CQI comprises a smaller number of bits than the second CQI.

13. The apparatus according to claim 8, wherein the processing circuitry is configured to represent the differentially-encoded second CQI using no more than three bits.

14. The apparatus according to claim 8, wherein the processing circuitry is configured to represent the differentially-encoded second CQI using no more than two bits.

15. A mobile communication terminal comprising the apparatus of claim 8.

16. A chipset for processing signals in a mobile communication terminal, comprising the apparatus of claim 8.

* * * * *